(12) United States Patent
Cho

(10) Patent No.: US 7,586,538 B2
(45) Date of Patent: Sep. 8, 2009

(54) APPARATUS FOR LOCKING CAMERA OF MOBILE TERMINAL

(75) Inventor: Kwan-Keun Cho, Seoul (KR)

(73) Assignee: LG Electronics, Inc., Seoul (KR)

( * ) Notice: Subject to any disclaimer, the term of this patent is extended or adjusted under 35 U.S.C. 154(b) by 701 days.

(21) Appl. No.: 10/913,750

(22) Filed: Aug. 5, 2004

(65) Prior Publication Data

US 2005/0031337 A1    Feb. 10, 2005

(30) Foreign Application Priority Data

Aug. 9, 2003    (KR) .................... 10-2003-0055188

(51) Int. Cl.
   *H04N 5/225*    (2006.01)
   *H04B 7/00*    (2006.01)
   *H04M 1/00*    (2006.01)

(52) U.S. Cl. .................. 348/374; 348/376; 455/66.1; 455/556.1

(58) Field of Classification Search ......... 348/373–376; 455/66.1, 556.1–556.2, 575.1–575.2
   See application file for complete search history.

(56) References Cited

U.S. PATENT DOCUMENTS

| 5,345,284 A * | 9/1994 | Tsuruta .................. 396/190 |
|---|---|---|
| 5,414,444 A * | 5/1995 | Britz .................... 345/156 |
| 6,704,586 B2 | 3/2004 | Park .................... 455/575.3 |
| 6,785,935 B2 * | 9/2004 | Ahn et al. .................. 16/221 |
| 6,904,298 B2 * | 6/2005 | Arai et al. ................ 455/556.1 |
| 6,975,273 B1 * | 12/2005 | Choi .................... 343/702 |
| 7,146,200 B2 * | 12/2006 | Park et al. .............. 455/575.3 |
| 7,418,280 B2 * | 8/2008 | Lee .................... 455/575.3 |
| 2002/0187818 A1 * | 12/2002 | Kang .................... 455/575 |
| 2003/0109232 A1 | 6/2003 | Park et al. .................. 455/90 |

FOREIGN PATENT DOCUMENTS

| EP | 001324594 A2 * | 7/2003 |
|---|---|---|
| KR | 010059498 A | 7/2001 |
| KR | 1020030026652 A | 4/2003 |
| KR | 1020030047105 A | 6/2003 |

* cited by examiner

*Primary Examiner*—Sinh Tran
*Assistant Examiner*—Daniel M Pasiewicz
(74) *Attorney, Agent, or Firm*—Lee, Hong, Degerman, Kang & Waimey

(57) ABSTRACT

An apparatus for locking a camera of a mobile terminal comprising a camera housing having a camera lens, a casing in which the camera housing is rotatably inserted, and a rotation angle fixing unit operating between the camera housing and the casing, for fixing a rotation angle of the camera housing. Accordingly, an unintended rotation of the camera housing is prevented and thus a user can stably photograph an object by securing a photographing angle of the camera.

17 Claims, 4 Drawing Sheets

APPARATUS FOR LOCKING CAMERA OF MOBILE TERMINAL

CROSS-REFERENCE TO RELATED APPLICATIONS

Pursuant to 35 U.S.C. § 119(a), this application claims the benefit of earlier filing date and right of priority to Korean Application No. 10-2003-0055188, filed on Aug. 9, 2003, the contents of which are hereby incorporated by reference herein in its entirety.

BACKGROUND OF THE INVENTION

1. Field of the Invention

The present invention relates to a mobile terminal, and more particularly, to a locking apparatus capable of fixing a rotation angle of a camera rotatably mounted to a mobile terminal.

2. Description of the Related Art

Recently, with the generalization of mobile communication terminals and the commercialization of radio Internet services using mobile communication terminals, demands on the terminals are being diversified. In response to such demands, mobile terminals integrally provided with digital cameras are being put on the market. Such mobile terminals include a digital camera which can implement not only a radio communication function, such as a wireless telephone call or an Internet communication, but can also function as a digital camera which can photograph an object, store its image data, and then edit, transmit and/or delete the image data as the need arises.

Mobile terminals provided with digital cameras are being fabricated in various forms. One example is a mobile terminal having a digital camera permanently mounted thereto. Another example is a mobile terminal having a digital camera detachably mounted thereto. Additionally, mobile terminals wherein the position of where a digital camera lens is mounted varies according to the type of mobile communication terminal are also being fabricated.

Typically, a camera provided for in a conventional mobile terminal is rotatably installed inside a hinge portion connecting a terminal main body to a terminal folder and is rotated in a direction that the folder rotates so that a camera lens faces toward an object.

However, because the conventional camera is not provided with a means for preventing undesired rotation of the camera, it is easily and unintentionally rotated and thus an object to be photographed may not be photographed at the desired angle when the mobile terminal is shaken or when an external force is applied to the camera.

SUMMARY OF THE INVENTION

An object of the present invention is to provide an apparatus for locking a camera of a mobile terminal capable of preventing unintended rotation of a rotary camera of a mobile terminal.

To achieve these and other advantages and in accordance with the purpose of the present invention, as embodied and broadly described herein, there is provided an apparatus for locking a camera of a mobile terminal, comprising a camera housing having a camera lens, a casing in which the camera housing is rotatably inserted, and a rotation angle fixing unit operating between the camera housing and the casing, for fixing a rotation angle of the camera housing.

In one aspect of the invention, the rotation angle fixing unit comprises a gear member formed at a side of the camera housing, and a fixing means formed within the casing for engaging the gear member, wherein the gear member comprises a plurality of gear teeth formed at regular intervals in a circumferential direction of the camera housing, and the fixing means selectively meshes with the gear teeth as the camera housing is rotated to prevent unintended rotation of the camera housing.

In another aspect of the invention, the fixing means comprises an elastic member formed in a groove of the casing, and a fixing protrusion extending from a surface of the elastic piece toward the gear member for selectively meshing with the gear teeth.

In yet another aspect of the invention, the fixing means comprises a connection member hingedly connected to the casing, a protrusion extending from the connection member for selectively meshing with the gear teeth, and an elastic member elastically connecting the connection member to the casing.

In yet a further aspect of the invention, the fixing means comprises a locking ball placed in a recessed portion of the casing, and an elastic member inserted in the recessed portion, the elastic member elastically supporting the locking ball.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

The present invention relates to a locking apparatus for fixing a rotation angle of a camera rotatably mounted to a mobile terminal.

Figure 1:
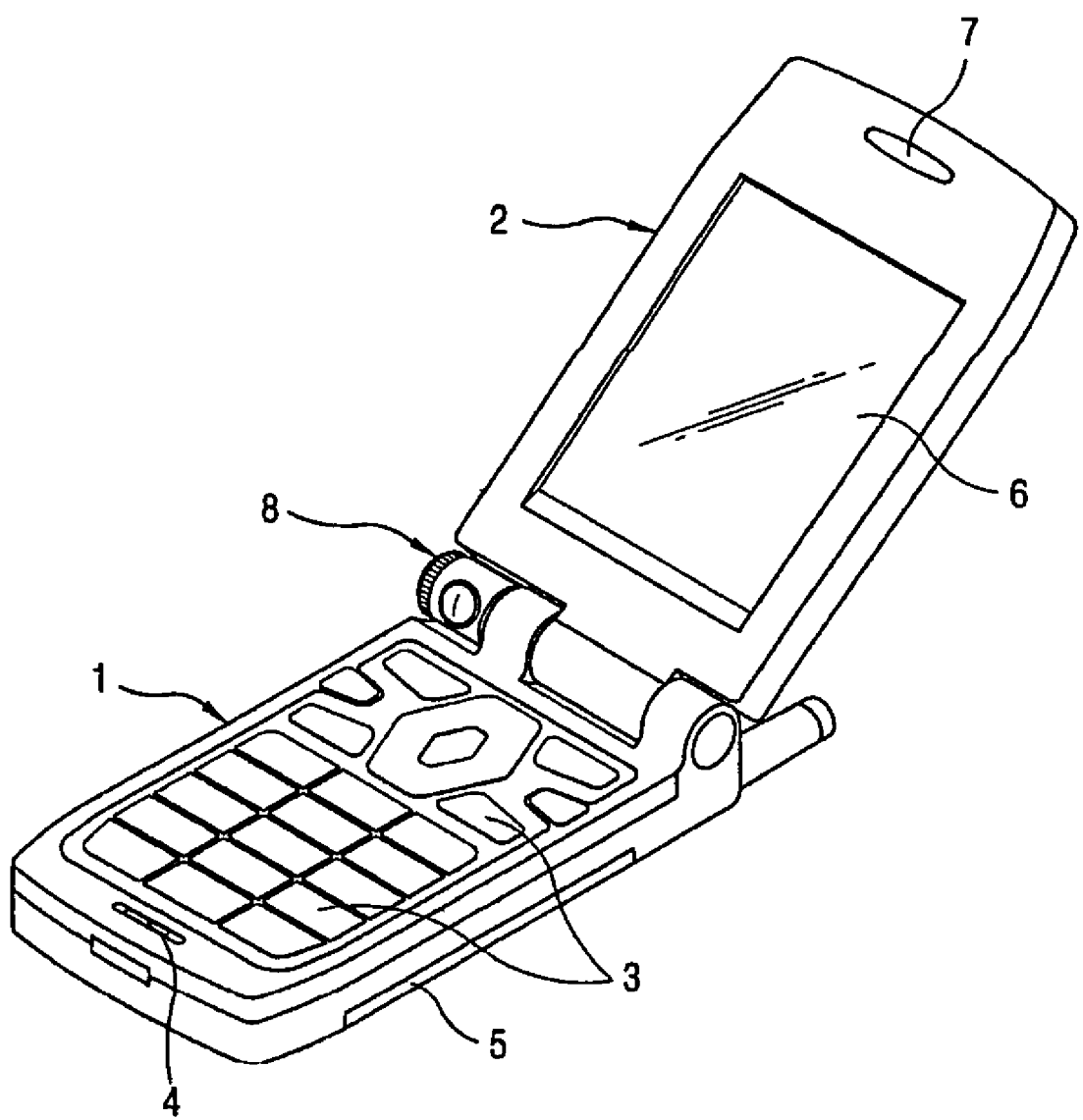
FIG. 1 is a perspective view showing a mobile terminal in accordance with an embodiment of the present invention.

As shown in FIG. 1, a mobile terminal in accordance with the present invention comprises a terminal main body 1 including a plurality of keys 3 for inputting user information, a transmitter 4 for inputting a voice signal of the user and a battery 5 detachably mounted to the main body for supplying power. The mobile terminal further comprises a terminal folder 2 hingedly connected to the main body 1 and includes a display panel 6 for displaying image information and a receiver 7 for transmitting a voice signal to the user. A camera 8 for photographing an object is rotatably installed at a portion of the mobile terminal where the terminal main body 1 and the terminal folder 2 are hingedly connected to each other. The mobile terminal further includes a camera locking apparatus for mounting the camera 8 to the mobile terminal.

Figure 2:
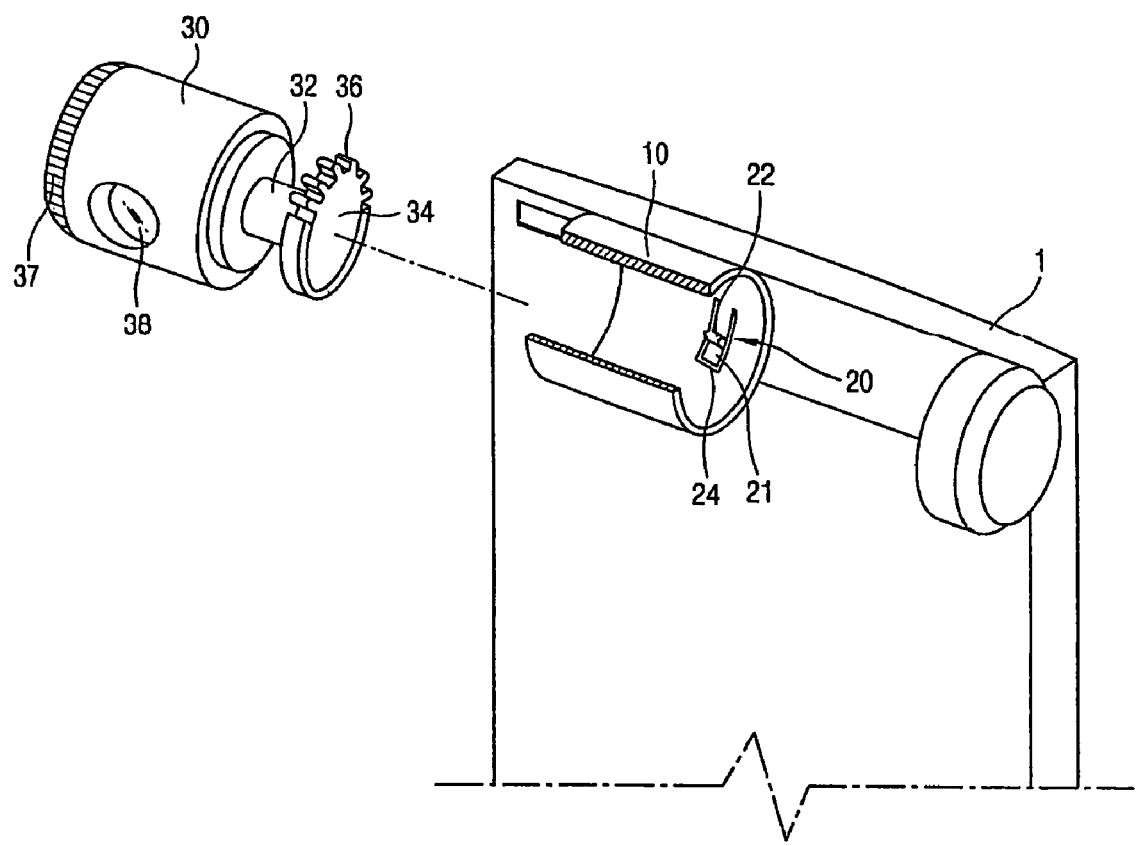
FIG. 2 is a disassembled perspective view showing a main part of a mobile terminal in accordance with an embodiment of the present invention.

As shown in FIG. 2, the camera locking apparatus comprises a camera housing 30 having a camera lens 38, a casing 10 formed at the main body 1, in which the camera housing 30 is rotatably inserted, and a rotation angle fixing unit operating between the camera housing 30 and the casing 10, for fixing a rotation angle of the camera housing. Preferably, the rotation angle fixing unit comprises a gear member 34 formed at a side of the camera housing 30 and a rotation angle fixing means 20 formed within the casing 10 for engaging the gear member 34. The gear member 34 is preferably formed at an end of an extension shaft 32 extending from a side of the camera housing 30 and comprises a plurality of gear teeth 36 formed at regular intervals in a circumferential direction of the camera housing 30. Preferably, the fixing means 20 fixes the rotation angle of the camera housing by selectively meshing with the gear teeth 36 as the camera housing 30 is rotated to prevent undesired rotation of the camera housing.

A diameter of the camera housing 30 is smaller than an inner diameter of the casing 10. As such, when the camera housing 30 is inserted into the casing 10, a predetermined gap between a circumferential surface of the camera housing 30 and the inner circumferential surface of the casing 10 is maintained. Meanwhile, in order to make rotating the camera housing easier on the user, a concavo-convex portion 37 is formed at a circumferential surface of a side of the camera housing 30.

It is contemplated that the gear teeth 36 of the gear member 34 may be formed at an entire circumferential surface of the gear member 34; however, preferably, the gear teeth 36 are formed at a partial portion of the circumferential surface of the gear member 34 in order to reduce the number of processes for forming the gear teeth 36.

Figure 3:
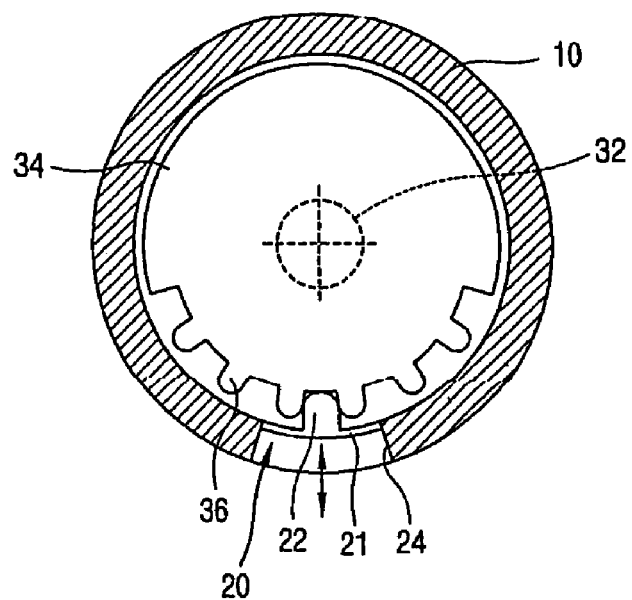
FIGS. 3 and 4 are sectional views for describing a structure and an operation of an apparatus for locking a camera of a mobile terminal in accordance with an embodiment of the present invention.
Figure 4:
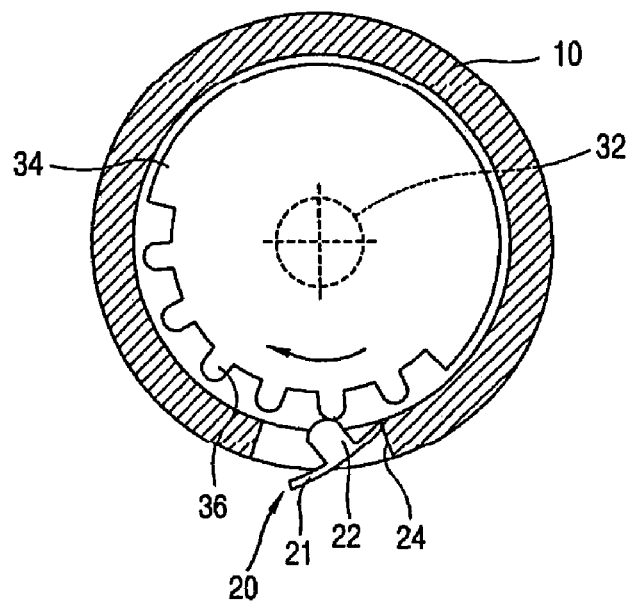

As shown in FIGS. 3 and 4, the fixing means 20 comprises an elastic member 21 formed in a groove 24, the elastic member 21 and the groove 24 formed by cutting a part of an inner wall of the casing 10, and a fixing protrusion 22 extending from a surface of the elastic member 21 toward the gear member 34, for selectively meshing with the gear teeth 36 to restrain rotation of the gear member 34.

Preferably, the groove 24 is formed in a quadrangular shape along a circumferential direction of the casing 10. Similarly, the elastic member 21 is formed in a quadrangular shape extended in a direction that the gear teeth 36 are arranged.

Preferably, an end portion of the fixing protrusion 22 facing the gear member 34 is formed in a rounded shape in consideration of a friction resistance between itself and the gear teeth 36 of the gear member 34. Accordingly, the end portions of the gear teeth 36 are also preferably formed in a rounded shape.

By such construction, the camera housing 30 may be inserted in the casing 10 in a state that a gear tooth 36 of the gear member 34 is meshed with the fixing protrusion 22 of the elastic member 21 formed in the casing 10.

Accordingly, as shown in FIG. 3, because the fixing protrusion 22 meshed with the gear tooth 36 of the gear member 34 restrains the rotation of the gear member 34, unintended rotation of the camera housing 30 is prevented.

As shown in FIG. 4, when a user rotates the camera housing 30, the gear tooth 36 meshed with the fixing protrusion 22 moves and pushes the fixing protrusion 22 and the elastic member 21. Subsequently, the pushed protrusion 22 meshes with another gear tooth 36 that sequentially approaches the protrusion by the rotation of the camera housing 30. In such a manner, the camera housing 30 is rotated. When the camera housing 30 is stopped, the elastic member 21 returns to its initial position by its own elastic restoring force. Accordingly, the fixing protrusion 22 is meshed with a sequential gear tooth 36 to thereby fix a rotation angle of the camera housing 30.

Because an end portion of each gear tooth 36 of the gear member 34 and an end portion of the fixing protrusion 22 face each other, and are respectively formed in a rounded shape, the camera housing 30 can be smoothly rotated when the fixing protrusion 22 pushes each gear tooth 36 to sequentially mesh therewith.

Also, because the gear teeth 36 are preferably formed at a partial portion of the circumference of the gear member 34, the camera housing 30 is prevented from being rotated at more than a predetermined angle.

As so far described, as for an apparatus for locking a camera of a mobile terminal in accordance with the present invention, the camera housing 30 is rotated by operation of a user but is not unintentionally rotated by external impact or the like so that an object can be stably photographed at a desired photographing angle.

Figure 5:
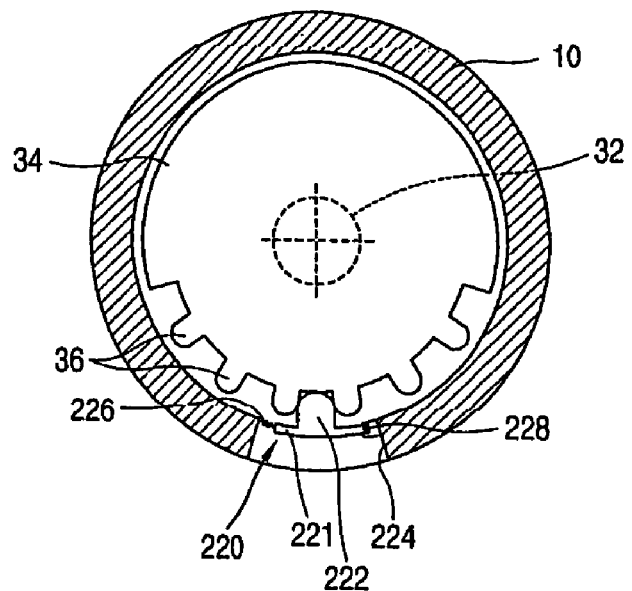
FIG. 5 is a sectional view showing an apparatus for locking a camera of a mobile terminal in accordance with another embodiment of the present invention.

FIG. 5 shows another embodiment of an apparatus for locking a camera of a mobile terminal. As shown in FIG. 5, a fixing means 220 for preventing unintended rotation of a camera housing 30 comprises a connection member 221 rotatably connected to a hinge mechanism 228, the hinge mechanism 228 being formed at a recess groove 224 of the casing 10, a protrusion 222 extending from the connection member 221 for selectively meshing with the gear teeth 36 of the gear member 34, and an elastic member 226 elastically connecting the connection member 221 to the casing 10.

According to such construction, when a user rotates the camera housing 30, the gear tooth 36 pushes the protrusion 222 to cause the connection member 221 to rotate about the hinge mechanism 228. In such a manner, the camera housing 30 is rotated to thereby control a photographing angle. When the camera housing 30 is stopped, the connection member 221 returns to its initial position by an elastic restoring force of the elastic member 226. Accordingly the protrusion 222 is meshed with the gear teeth 36 so that unintended rotation of the camera housing 30 is prevented.

Figure 6:
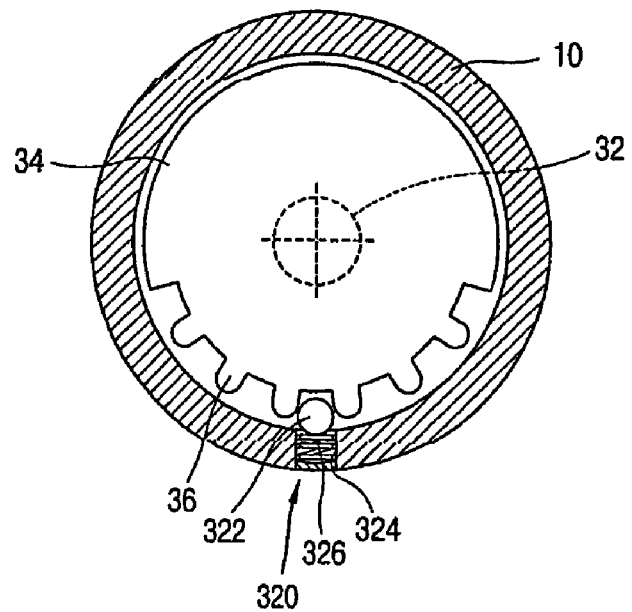
FIG. 6 is a sectional view showing an apparatus for locking a camera of a mobile terminal in accordance with yet another embodiment of the present invention.

FIG. 6 shows yet another embodiment of an apparatus for locking a camera of a mobile terminal in accordance with the present invention. As shown in FIG. 6, a fixing means 320 for preventing unintended rotation of a camera housing 30 comprises a locking ball 322 placed in a recessed portion 324 of the casing 10, and an elastic member 326 inserted in the recessed portion 324, the elastic member elastically supporting the locking ball 322.

According to such construction, when a user rotates the camera housing 30, the gear tooth 36 of the gear member 34 moves and pushes the locking ball 322. In such a manner, the camera housing 30 is rotated to thereby control a photographing angle. When the camera housing 30 is stopped, the locking ball 322 is inserted between the gear teeth 36 by the elastic restoring force of the elastic member 326 to thereby prevent unintended rotation of the camera housing 30.

As so far described, an apparatus for locking a camera of a mobile terminal in accordance with the present invention prevents the camera from being unintentionally rotated in case that the mobile terminal is shaken or an external force is applied to the camera, so that a user can secure a photographing angle of the camera.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for locking a camera of a mobile terminal, the apparatus comprising:
    a camera housing comprising a camera lens;
    a casing in which the camera housing is rotatably inserted; and
    a rotation angle fixing unit operating between the camera housing and the casing, and configured to fix a rotation angle of the camera housing, the rotation angle fixing unit comprising:
        a gear member formed at an end of an extension shaft extending from a first side of the camera housing; and
        a fixing means formed within the casing for engaging the gear member and provided with a base member having a first end portion coupled to the casing and a second end portion configured to pivot about the first end portion toward or away from the gear member,
    wherein the gear member and the extension shaft extending from the first side of the camera housing are rotatably inserted into the casing, and a second side of the camera housing is not inserted into the casing and is exposed toward an opposite direction of the casing such that an entire surface of the second side is visible, the second side being an opposite side of the first side.

2. The apparatus of claim 1, wherein:
    the gear member comprises a plurality of gear teeth formed at regular intervals in a circumferential direction of the camera housing; and
    the fixing means selectively meshes with the gear teeth as the camera housing is rotated to prevent unintended rotation of the camera housing.

3. The apparatus of claim 1, wherein a diameter of the camera housing is smaller than an inner diameter of the casing.

4. The apparatus of claim 2, wherein the gear teeth of the gear member are formed at a partial portion of the circumference of the gear member.

5. The apparatus of claim 2, wherein the the base member comprises an elastic member formed in a groove of the casing, the elastic member having the first end portion elastically connected to the casing, and
    wherein the fixing means comprises a fixing protrusion extending from the second end portion of the elastic member toward the gear member for selectively meshing with the gear teeth.

6. The apparatus of claim 5, wherein the elastic member and the groove are formed by cutting a part of an inner wall of the casing.

7. The apparatus of claim 6, wherein the groove is formed in a quadrangular shape along a circumferential direction of the casing.

8. The apparatus of claim 6, wherein the elastic member is formed in a quadrangular shape extended in a direction that the gear teeth are arranged.

9. The apparatus of claim 5, wherein an end portion of the fixing protrusion is formed in a rounded shape.

10. The apparatus of claim 5, wherein an end portion of each gear tooth of the gear member is formed in a rounded shape.

11. The apparatus of claim 2, wherein the base member comprises a connection member having the first end portion connected to the casing via a hinge, and
    wherein the fixing means comprises a protrusion extending from the second end portion of the connection member for selectively meshing with the gear teeth; and
    an elastic member elastically connecting the second end portion of the connection member to the casing.

12. The apparatus of claim 11, wherein the connection member is configured to be disposed at a recess groove of the casing.

13. The apparatus of claim 11, wherein an end portion of the protrusion is formed in a rounded shape.

14. The apparatus of claim 11, wherein an end portion of each gear tooth of the gear member is formed in a rounded shape.

15. The apparatus of claim 1, wherein surfaces of the first and second sides of the camera housing are parallel.

16. The apparatus of claim 1, wherein centers of the first and second sides of the camera housing are on a same axis of rotation as the camera housing.

17. The apparatus of claim 1, wherein a concavo-convex portion is formed at a circumferential surface of the second side of the camera housing to facilitate rotation of the camera housing.

* * * * *